(No Model.)

C. C. DAVIS.
ROLLER SKATE.

No. 341,999. Patented May 18, 1886.

Attest:
E. N. Peckan
Otto Richter.

Inventor,
Chas. C. Davis

UNITED STATES PATENT OFFICE.

CHARLES C. DAVIS, OF CINCINNATI, OHIO.

ROLLER-SKATE.

SPECIFICATION forming part of Letters Patent No. 341,999, dated May 18, 1886.

Application filed April 6, 1885. Serial No. 161,272. (No model.)

*To all whom it may concern:*

Be it known that I, CHARLES C. DAVIS, a citizen of the United States, residing at Cincinnati, in the county of Hamilton and State of Ohio, have invented certain new and useful Improvements in Roller-Skates, of which the following is a full, clear, and exact description, reference being had to the accompanying drawings, forming part of this specification.

My invention relates to an improvement in roller-skates, and more particularly to means of providing a brake for controlling the motion of the skate; and it consists in the construction of the rear truck of the skate arranged to have a forward swinging motion, in combination with a brake so pivoted as to be automatically adjusted to the wheels of the rear truck when swung forward by the elevation of the toe or forward end of the skate.

Figure 1:
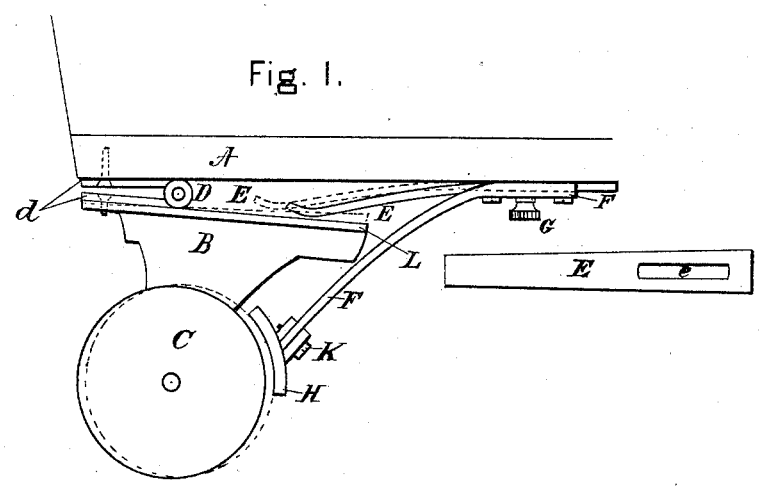
Figure 2:
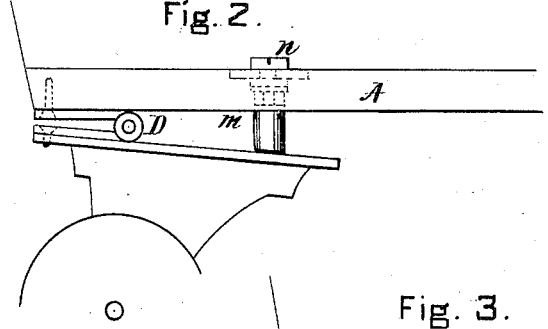
Figure 3:
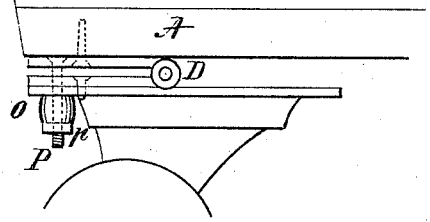

In the accompanying drawings, Figure 1 is a side elevation of the rear truck of a skate with my improved brake. Fig. 2 is the rear end of the foot-plate of a skate, showing a modified form of the spring which governs the swinging truck. Fig. 3 is still another form of spring.

The same letters of reference are used to indicate identical parts in all the figures.

A is the ordinary foot-plate of a roller-skate, supported upon two trucks, one near each end.

B is the rear truck, supported by two wheels, C, only one being shown. The truck B is attached to the rear end of the foot-plate by a hinge, D. Any suitable form of hinge may be used. By means of this hinge the truck B is permitted a slight swinging motion. The wings d d of the hinge, when this form is used, are made of such a length that the center of gravity of the rear end of the skate when in its normal position—that is, level with both trucks on the floor—is forward of the hinge D, so that the truck will be swung back and the hinge closed; or, if more desirable, a spring may be inserted between the forward end of the truck and the bottom of the plate A, as shown at E, Fig. 1. The spring, pressing down on the forward end of the truck, serves to swing it backward, the object in either case being simply to hold the truck in its backward position when the skate is level—that is, in its normal position with both trucks on the floor.

F is a bar or rod, the upper end of which is attached to the under side of the plate A, in front of the truck, by the set-screw G. This set-screw passes through a longitudinal slot in the bar, by means of which the bar may be adjusted backward or forward. The other end of the bar F extends downward and backward to a point just in front of the wheels C. To the end of this rod or bar is pivoted a block, H, extending across the face of both wheels, and curved or concaved to fit the periphery of the wheels. By means of the pivot K one end of this block H may be swung forward and the other backward, and so adjust itself to the two wheels when either is thrown forward by reason of the tipping of the skate in making a curve.

When the spring-trucks are not used and one wheel is not thrown forward by the tipping of the skate, the pivot K need not be used, but the block H may be rigidly attached to the bar F.

When the backward throw of the hinge is not limited, a shoulder, L, is provided on the bar F to support the truck and prevent its swinging too far back. It will generally be found that the shoulder L or an equivalent support will be required to relieve the strain on the truck.

In operation, as the toe or forward part of the skate is lifted the center of gravity of the weight supported by the truck is thrown backward, causing the truck to swing forward on its hinge, bringing the wheels C in contact with the block H, which acts as a brake and stops the skate. Of course the higher the toe is lifted the farther back will be the center of gravity and the greater the pressure of the wheels against the brake. The spring E must be sufficiently yielding to permit the truck to swing forward under the weight of the skater when the toe is raised, and in order that it may be adjusted to different weights it is provided with a slot, e, by which it may be moved forward or backward, its resistance being varied by the length of the free end, or according to its adjustment backward or forward.

In Fig. 2 is shown a modified form of spring. Instead of the spring G, a rubber block, M, is attached to the lower side of the plate A, between it and the forward end of the truck, for holding the truck or wheels away from the brake when the skate is level, or both wheels on the floor. A coiled spring may be used in place of the rubber block. The spring should be sufficiently yielding to permit the truck to swing forward as the weight is thrown back. The coil or rubber spring M is let into the wooden plate A to any convenient distance, and a screw, N, extending downward through the plate A, is arranged to press against the upper end of the spring M. By this screw the tension of the spring M between the under side of the plate A and the truck is regulated according to the weight of the skater.

Fig. 3 shows another modification of the spring, consisting of the pin P, passing through both wings of the hinge, or through the foot-plate of the skate back of the hinge, and the plate of the truck, and on the lower end of which is a block of elastic rubber or coiled spring, O, held in place by the nut $p$. The upward pressure of this spring tends to close the hinge and swing the truck backward and hold it in that position when the skate is level. When, however, the toe of the skate is raised and the weight thrown back, the spring O is compressed and the truck and wheels thrown forward, bringing the wheels into contact with the brake. The resistance of the spring may be varied by moving the nut $p$ up or down on the pin P. This spring is only a part of my invention, and I do not limit myself to any particular form of spring.

I am aware that it has been proposed to provide a roller-skate with two foot-pieces, one carrying a brake adapted to be brought against the rollers or into engagement with a ratchet-wheel upon the axle thereof by throwing the weight of the skater upon the heel; but I am not aware that it has ever before been proposed to so connect the roller or truck frame with the sole-plate that upon thus bringing the weight upon the heel the truck or roller frame should be caused to move up to and bear against a brake carried by the sole-plate. My construction is simpler and cheaper than one involving two foot-pieces, can be made of usual and suitable height, with rollers of ordinary size, and applies the brake with certainty, yet without sudden strain or jar.

Having thus fully described my invention, I claim—

1. In a roller-skate, the rear truck hinged to the foot-plate so as to swing forward as the toe of the skate or forward truck is raised to bring the wheels of the truck in contact with a fixed brake, substantially as described.

2. In a roller-skate, a brake attached to the foot-plate, in combination with a hinged or swinging truck, substantially as and for the purpose described.

3. In a roller-skate, the rear truck hinged to the foot-plate so as to swing forward as the toe of the skate is raised, in combination with a brake attached to the foot-plate forward of the truck, and provided with a brake block or rubber, H, so pivoted as to be automatically adjusted to the wheels, substantially as and for the purpose described.

4. In a roller-skate, the rear truck hinged to the foot-plate, in combination with a spring arranged to swing the truck backward and hold it in that position when the skate is level, and sufficiently yielding to permit the truck to swing forward as the front end of the skate is raised from the floor, substantially as and for the purpose described.

5. In a roller-skate, in combination with a hinged or swinging truck, a spring arranged to press the truck backward when the skate is level, and yielding to permit the truck to swing forward when the toe is raised from the floor, and made adjustable to offer greater or less resistance, according to the weight or pressure on the skate.

6. In a roller-skate, the combination, with a sole-plate, of a truck-frame hinged at its rear end thereto and carrying rollers, a spring bearing at one end upon the sole-plate and at the other end upon the truck-frame, and a fixed brake-bar connected to the sole-plate and adapted, substantially as described and shown, to bear against the roller of the truck-frame when the sole-plate is tipped.

CHAS. C. DAVIS.

Witnesses:
E. W. RECTOR,
OTTO RICHTER.